United States Patent
Wysocki et al.

(10) Patent No.: US 11,228,632 B1
(45) Date of Patent: Jan. 18, 2022

(54) FACILITATING INTER-SYSTEM DATA TRANSFER BY LEVERAGING FIRST-PARTY COOKIE HANDLING

(71) Applicant: TD Ameritrade IP Company, Inc., Omaha, NE (US)

(72) Inventors: Kevin Michael Wysocki, Denver, CO (US); Michelle Schroeder, O'Fallon, MO (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 17/060,041

(22) Filed: Sep. 30, 2020

Related U.S. Application Data

(60) Provisional application No. 63/082,401, filed on Sep. 23, 2020.

(51) Int. Cl.
  *H04L 29/08* (2006.01)
  *G06Q 30/02* (2012.01)

(52) U.S. Cl.
  CPC ............ *H04L 67/02* (2013.01); *G06Q 30/02* (2013.01); *G06Q 30/0255* (2013.01); *G06Q 30/0277* (2013.01); *H04L 67/20* (2013.01); *H04L 67/22* (2013.01)

(58) Field of Classification Search
  None
  See application file for complete search history.

(56) References Cited

U.S. PATENT DOCUMENTS

| | | | |
|---|---|---|---|
| 5,948,061 A | 9/1999 | Merriman et al. | |
| 8,898,808 B1 * | 11/2014 | Kittrell | H04L 67/22 726/30 |
| 8,990,359 B1 * | 3/2015 | Ravi | H04L 67/10 709/219 |
| 9,135,655 B2 * | 9/2015 | Buchalter | G06Q 30/0241 |
| 9,219,787 B1 * | 12/2015 | Manion | H04L 67/02 |
| 9,332,065 B2 * | 5/2016 | Ravi | H04L 67/20 |
| 9,361,631 B2 * | 6/2016 | Meyer | G06Q 30/0256 |
| 9,418,170 B2 * | 8/2016 | Seolas | G06Q 30/00 |
| 9,553,918 B1 * | 1/2017 | Manion | G06F 16/00 |

(Continued)

OTHER PUBLICATIONS

A. Barth; Internet Engineering Task Force (IETF); "RFC 6265—HTTP State Management Mechanism"; Apr. 2011; 37 pages.

*Primary Examiner* — Lashonda T Jacobs
(74) *Attorney, Agent, or Firm* — Harness, Dickey & Pierce, P.L.C.; David J. Tucker

(57) ABSTRACT

A system for capturing impression data includes a server in communication with a user's computing device via a communications network. The server is configured to generate a pixel for embedding in a digital communication viewable in a web browser on the user's computing device. The pixel is served from a domain associated with the server. The server is configured to, in response to the digital communication being viewed in the web browser on the user's computing device, set a cookie on the user's computing device via the pixel. The cookie is configured to store data associated with one or more impressions of digital communications viewed on the user's computing device. The server is configured to, in response to the user's computing device accessing the domain via the web browser, receive the stored data associated with the one or more impressions from the cookie set on the user's computing device.

13 Claims, 6 Drawing Sheets

(56) References Cited

U.S. PATENT DOCUMENTS

| | | | | |
|---|---|---|---|---|
| 9,553,923 B2 * | 1/2017 | Ravi | ....................... | H04L 67/20 |
| 9,691,080 B1 * | 6/2017 | Torrance | ............... | H04L 67/146 |
| 9,973,585 B2 * | 5/2018 | Ruback | ................... | H04W 4/21 |
| 10,108,982 B2 * | 10/2018 | Patton | ................ | G06Q 30/0269 |
| 10,861,047 B2 * | 12/2020 | Patton | ................ | G06Q 30/0255 |
| 2005/0165644 A1 * | 7/2005 | Beyda | ............... | G06Q 30/0277 |
| | | | | 705/14.56 |
| 2011/0029376 A1 * | 2/2011 | Mills | ................. | G06Q 30/0244 |
| | | | | 705/14.43 |
| 2011/0246267 A1 * | 10/2011 | Williams | ............... | G06Q 30/02 |
| | | | | 705/14.4 |
| 2012/0054143 A1 * | 3/2012 | Doig | ................. | G06Q 30/0269 |
| | | | | 706/47 |
| 2013/0136253 A1 * | 5/2013 | Liberman Ben-Ami | .................... | |
| | | | | H04M 3/5191 |
| | | | | 379/265.09 |
| 2014/0244387 A1 * | 8/2014 | Patton | ................ | G06Q 30/0269 |
| | | | | 705/14.53 |
| 2014/0278926 A1 * | 9/2014 | Close | ................ | G06Q 30/0246 |
| | | | | 705/14.45 |
| 2015/0058121 A1 * | 2/2015 | Navin | ................ | G06Q 30/0255 |
| | | | | 705/14.53 |
| 2015/0170200 A1 * | 6/2015 | Rajkumar | .......... | G06Q 30/0241 |
| | | | | 705/14.49 |
| 2016/0180375 A1 * | 6/2016 | Rose | ................ | G06Q 30/0244 |
| | | | | 705/14.43 |
| 2017/0178253 A1 * | 6/2017 | Koufogiannakis | .... | G06Q 50/01 |
| 2017/0357998 A1 * | 12/2017 | Scharf | ............... | G06Q 30/0277 |
| 2017/0372376 A1 * | 12/2017 | Scharf | ............... | G06Q 30/0273 |
| 2018/0225711 A1 * | 8/2018 | Murugesan | ........ | G06Q 30/0254 |

\* cited by examiner

FACILITATING INTER-SYSTEM DATA TRANSFER BY LEVERAGING FIRST-PARTY COOKIE HANDLING

CROSS-REFERENCE TO RELATED APPLICATIONS

This application claims the benefit of U.S. Provisional Application No. 63/082,401 filed Sep. 23, 2020, the entire disclosure of which is incorporated by reference.

FIELD

The present disclosure relates to systems and methods for digital tracking and more particularly to systems and methods for digital tracking of web interactions using cookies.

BACKGROUND

Digital advertising has become increasingly important to companies as users across the world are spending more time online. For example, companies may rely on targeted advertising directed to specific users based on certain traits, products, services, etc. Cookies are commonly relied on to implement targeted advertising. For example, cookies may be set on a user's computing device by a web browser while browsing a website. The cookies may be used to identify users and track information such as items added to a digital shopping cart, user's browsing activities, etc.

The cookies set on the computing device may include first-party cookies and third-party cookies. First-party cookies are cookies created and stored by host domains (e.g., the domains such as websites, email services, etc. visited by the user). Third-party cookies are cookies created by domains other than the one the user is visiting at the time. Third-party cookies are commonly used in cross-site tracking, targeting and ad-serving.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for capturing impression data includes a computer server in communication with a user's computing device via a communications network. The computer server is configured to generate a pixel for embedding in a digital communication viewable in a web browser on the user's computing device. The pixel is served from a domain associated with the computer server. The computer server is configured to, in response to the digital communication being viewed in the web browser on the user's computing device, set a cookie on the user's computing device via the pixel. The cookie is configured to store data associated with one or more impressions of digital communications viewed on the user's computing device. The computer server is configured to, in response to the user's computing device accessing the domain via the web browser, receive the stored data associated with the one or more impressions from the cookie set on the user's computing device.

In other features, the computer server is configured to update the cookie set on the user's computing device. In other features, the system includes a database in communication with the computer server and configured to store the received data associated with the one or more impressions. In other features, the data associated with each impression includes data identifying an advertisement and data identifying when the advertisement was viewed. In other features, the cookie set on the user's computing device is configured to store data associated with a defined number of impressions. In other features, the defined number of impressions includes ten impressions.

In other features, the cookie is configured to store data associated with the one or more impressions in a chronological order. In other features, in response to the defined number of impressions being met, the cookie is configured to push out data associated with the oldest viewed impression and store data associated with the newest viewed impression. In other features, the cookie is treated by the web browser as a first-party cookie if the user's computing device has previously accessed the domain.

A computerized method of capturing impression data includes generating a pixel for embedding in a digital communication viewable in a web browser on a user's computing device. The pixel is served from a domain associated with a computer server. The method includes, in response to the digital communication being viewed in the web browser on the user's computing device, using the computer server to set a cookie on the user's computing device via the pixel. The cookie is configured to store data associated with one or more impressions of digital communications viewed on the user's computing device. The method includes, in response to the user's computing device accessing the domain via the web browser, using the computer server to receive the stored data associated with the one or more impressions from the cookie set on the user's computing device.

In other features, the computerized method includes updating the cookie set on the user's computing device. In other features, the computerized method includes storing the received data associated with the one or more impressions. In other features, the data associated with each impression includes data identifying an advertisement and data identifying when the advertisement was viewed. In other features, the cookie set on the user's computing device is configured to store data associated with a defined number of impressions. In other features, the defined number of impressions includes ten impressions.

In other features, the cookie is configured to store data associated with the one or more impressions in a chronological order. In other features, in response to the defined number of impressions being met, the cookie is configured to push out data associated with the oldest viewed impression and store data associated with the newest viewed impression. In other features, the cookie is treated by the web browser as a first-party cookie if the user's computing device has previously accessed the domain.

A system for transferring data to and from a computing device of a user system includes processor hardware and memory hardware configured to store instructions for execution by the processor hardware. The instructions include generating a pixel for embedding in a digital communication viewable in a web browser on a computing device. The pixel is served from a domain associated with the system. The instructions include, in response to the digital communication being viewed in the web browser on the computing device, setting a cookie on the computing device via the pixel. The cookie is configured to store data associated with one or more impressions of digital communications viewed on the computing device. The instructions include, in response to the computing device accessing the domain via the web browser, receiving the stored data associated with the one or more impressions from the cookie set on the computing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
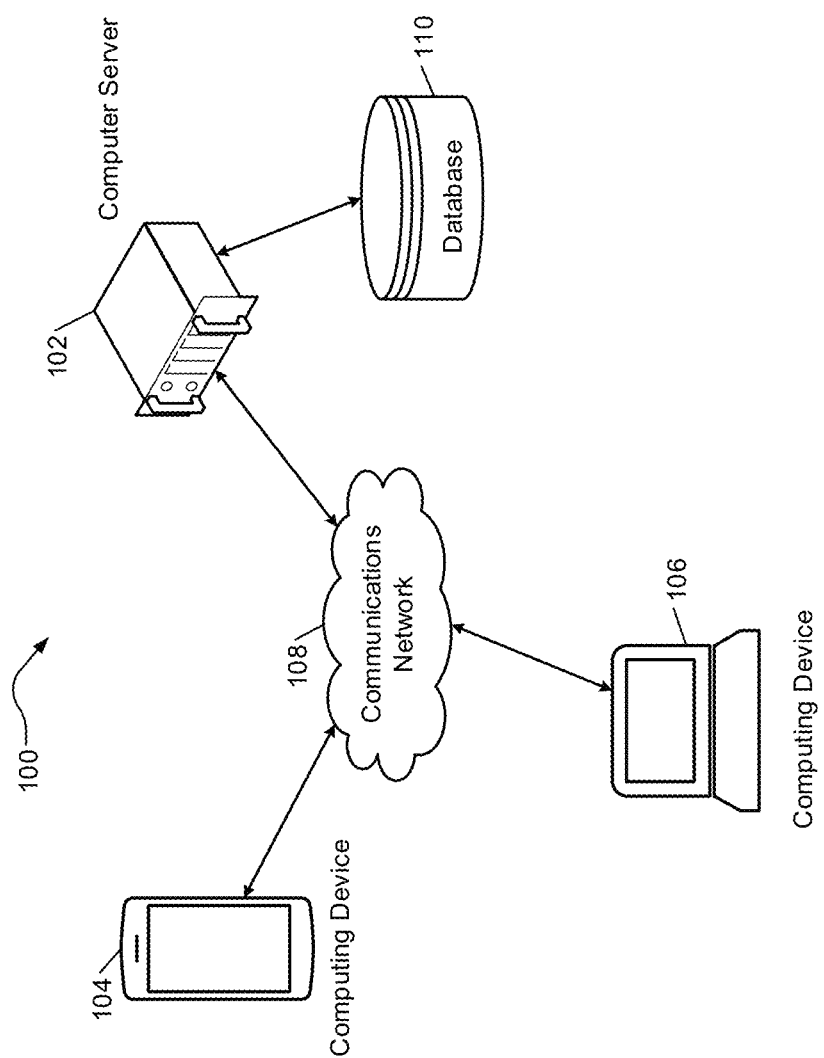
FIG. 1 is a functional block diagram of an example computer system for capturing impression data according to the principles of the present disclosure.

The present disclosure describes systems and methods of employing first-party cookies embedded in pixels of digital content (e.g., advertisements, emails, etc.) to implement database strategies to capture impressions and actions of users when users view and/or click on the digital content containing the pixel. For example, digital regulations are making it harder for companies to target and identify users, which is primarily done using cookies. However, web browsers are increasingly limiting third-party cookies. As such, it may be desirable to find a way to better identify people and market to them that's cookie-lite. For example, if a first-party pixel (e.g., created by a host domain) was embedded in digital content of a company when the content is served to users, impressions and exposure of the users may be captured so that the users can be appropriately targeted when they return to a website (e.g., domain) associated with the company.

For example, any one of the pixels embedded in digital content of a company may reach out to the company's server about that a specific request when an external advertisement is shown, an email is opened, etc. Logs may be generated for the advertisement, email, etc. being served to specific users. For example, ID string may include information about the advertisement, video, what creative, where it ran, etc. This information may be used to understand media performance and target specific users (e.g., an existing client, a prospect client, etc.).

If an email with an embedded pixel is sent to a specific user (e.g., a specific client), the pixel may include code tailored to the specific user. If the pixel is embedded in digital content on the open web, when the pixel goes out, it may carry some or all first-party cookies with it to help identify that user's specific web browser. This allows a company to know which of its ads were seen by users, when the ads were seen, and in what order they were seen.

Since the pixel is served from the company's domain, if a user is browsing around the web and sees one of the company's ads and has been to one of the company's domains before, the web browser treats the cookie as a friendly first-party cookie. Impressions may be stored inside the cookie itself rather than being stored in a separate database. As such, the information may be readily available (e.g. instantly available). In some examples, a defined number (e.g., ten) of impressions may be stored in the cookie on the user's browser.

Some web browsers have rules that make it hard for third parties to track IP addresses. For example, if a cookie is sent using JavaScript, the cookie may only last 5 days in some web browsers, rather than the industry standard of two years. By employing the teachings described herein, the life of the cookie may be extended via one or more server side requests. As such, the cookie may last as long as the server specifies.

In addition gauging user impressions and actions, the teachings help with fraud identification with respect to ads and impressions. By gaining information on both users (e.g., existing and prospective clients), a company can improve its ability to identify fraudulent activity. Further, by collecting some or all of the impressions data in-house, it allows the company's marketing team to analyze and understand effective message content, frequency and cadence, and ultimately better optimize millions of dollars in digital media spending.

The teachings also allow a company to run its own data collection as opposed to relying on third parties. This may be particular beneficial as third-party data begins to shrink. There's a significant cost savings to not rely on third parties and the independence gained by performing this work in house. For example, this has the potential to reduce the scope of work of third-party ad agencies and niche digital analytic vendors.

With tightening restrictions on third-party cookies, companies will need to get creative to deliver tailored experiences to users (e.g., clients) while carefully balancing personalization with privacy. Embedding pixels in digital content, and then triggering communications and data exchange with a company's server may help deliver such a tailored experience for a user. For example, automatic triggering of events based on interaction (e.g., loading, viewing, clicking on, etc.) with the digital content containing pixels having first-party cookies may help provide a tailored experience for a user The present disclosure describes a unique approach for implementing database strategies to capture impressions and actions of online users. The unique approach described herein embeds pixels (e.g., tags) in digital communications such as advertisements, emails, etc. viewable in a web browser, and then captures impressions when users view, click on, open, etc. the digital communications containing the pixels.

Web browsers are increasingly limiting third-party cookies created by domains other than the one being visiting directly. As such, companies may be substantially limited in targeting and identifying users using third-party cookies. However, when one or more features of the unique approach described herein are implemented, the pixels embedded in the digital communications (e.g., digital content) may be considered first-party pixels when the digital communications are served via a specific domain. For example, if a user has previously visited a website associated with the specific domain, the pixels served via the specific domain may be considered first-party pixels. Cookies in the pixels may then be set for storing data associated with the impressions. In such examples, the set cookies may be treated by the web browsers as friendly cookies, and not third-party cookies, because the user has previously visited a website associated with the specific domain. Once the user returns to a website associated with the specific domain, the stored impressions in the cookies may be captured.

The unique approach described herein allows a specific company to run its own data collection as opposed to relying on third parties. As a result, significant cost savings and greater independence may be realized. For example, the unique approach may reduce (and sometimes eliminate) the scope of work of third-party ad agencies and analytic vendors external to the company. Additionally, the data collected may be owned and freely usable by the company, as opposed data collected by third parties. This is particularly useful as third-party cookies and data begins to shrink. Further, collecting impression data in-house allows the company to analyze and understand effective message content, frequency, cadence, etc. of digital communications, and ultimately better optimize millions of dollars spent in digital media.

In some examples, the unique approach may also assist in fraud identification with respect to advertisements and impressions. For example, the ability to identify fraudulent activity may be improved when information on both existing and prospective clients (e.g., users) is obtained.

Block Diagram

In FIG. 1, a system 100 for capturing impression data is disclosed. As shown, the system 100 includes a computer server 102 in communication with computing devices 104, 106 via a communications network 108. The system 100 may optionally include a database 110 in communication with the computer server 102. While shown for illustrative purposes as a smartphone and a laptop, respectively, the computing devices 104, 106 may take other forms, such as a smartwatch, kiosk, smart television, etc.

In the embodiment of FIG. 1, the computer server 102 may generate a pixel for embedding in a digital content viewable in a web browser or other HTML rendering engine. For example, the pixel may be rendered on one or both of the computing devices 104, 106. In various implementations, the pixel is a 1×1 image. During the time that the digital content is viewable by a user, the pixel is generally too small to be seen by the user.

For example, the pixel may be embedded in: an advertisement on a website, an in-application advertisement (such as in a mobile device application), an advertisement within an email, the email itself, etc. In other implementations, the pixel may be embedded in an advertisement displayed to the user by a kiosk during an operation such as a financial transaction. For example, the advertisement may be displayed before, after, or during a cash withdrawal from an automated teller machine (ATM).

The computer server 102 may set a cookie on one of the computing devices 104, 106 via the pixel. For example, in response to the digital communication having the embedded pixel being viewed in the web browser on the computing device, the computer server 102 may set the cookie on that computing device. For instance, once the digital communication is viewed (e.g., by a user accessing a website with the digital communication, opening an email, etc.), the computer server 102 may receive a request from the embedded pixel. The computer server 102 may then set a cookie on the user's computing device based on the request from the pixel. In such examples, the cookie may be set by the web browser employed by the computing device.

In some examples, the embedded pixel may be carrying the cookie. For example, if the pixel is embedded in an email to a specific user, the pixel may be coded with a specific cookie to target that user. In such examples, the specific cookie may be considered a first-party cookie with respect to sites operated by a same operator as the computer server 102 (for example, hosted at the same domain). If the pixel is embedded in a digital communication (e.g., an advertisement) on the open web, the pixel may carry multiple (and in some cases all) operator first-party cookies with it. This may allow the computer server 102 identify the specific web browser employed by the computing device, as further explained herein.

In some examples, the web browser employed by the computing device may treat the cookie carried by the pixel as a friendly first-party cookie. For example, the pixel may be served from a domain associated with the computer server 102. In such examples, if the user is browsing around the web and views an advertisement with the embedded pixel (e.g., accesses a website with the advertisement) and has been to a domain associated with the computer server 102, the web browser may treat the cookie carried by the pixel as a friendly first-party cookie.

The cookie set on the computing device (e.g., by the web browser) may store data associated with one or more impressions of accessed digital communications. For example, when one of the computing devices 104, 106 accesses an email, a website with an advertisement, etc. having an embedded pixel, data associated with the viewed email, advertisement, etc. may be stored in the cookie itself. In such examples, the stored data may include data identifying a particular advertisement, a particular email, etc., and data identifying when the particular advertisement was viewed, the particular email was opened, etc. This data may contain, for example, information about the digital content such as which advertisement (and/or email) was viewed, when was the advertisement (and/or email) viewed, where the advertisement (and/or email) viewed (e.g., on which website, on which web browser, etc.), etc. In some examples, the data may contain information about media in the advertisement, the email, etc.

In some examples, the set cookie may be limited as to the number of impressions it may store. For example, the cookie set on the computing device 104 may store data associated with a defined number of impressions. The defined number of impressions may be set by the computer server 102 via, for example, user input. The defined number of impressions may be set by the computer server 102 before the cookie is set on the computing device 104, updated by the computer server 102, etc. The defined number of impressions may include any suitable number. For example, the defined number of impressions stored by the cookie may include seven impressions, ten impressions, fifteen impressions, twenty impressions, etc. The defined number may be set as described in more detail with respect to FIG. 6.

Additionally, the set cookie may store data associated with the impression(s) in a chronological order. For example, a first impression may be initially stored in the cookie in a first position. When a second impression is stored later in time, the first impression may be pushed down to a second position and the second impression may be pulled in and stored in the first position. In some examples, if the defined number of impressions stored by the cookie is met, the cookie may push out the data associated with the oldest impression, and store data associated with the newest impression.

As an example, the defined number of impressions storable by the cookie may be ten. If the cookie has stored data associated with ten impressions, the cookie may push out the data associated with the oldest impression (e.g., the impression stored in the tenth position) and move the other stored impressions to the subsequent positions. The cookie may then pull in and store the newest impression in the first position.

In various implementations, even if old impressions are pushed out, the cookie data may include a running tally of the total number of impressions the user has ever seen. So while the data may only have specific details about the 15 most recent impressions seen by the user, the cookie data can store the total number of impressions ever seen by that user (for example only, the number 84).

The computer server 102 may receive the stored data associated with the impression(s) from the cookie set on the computing device. Because the impression(s) are stored in the cookie itself, the data associated with the impression(s) may be available (e.g., instantly available) to the computer server 102 rather than needing to be obtained from a separate database. This is also true for other servers under the control of the operator. For example, the servers delivering the operator's digital websites may be separate from the servers delivering the pixel.

For example, if a cookie is set on the computing device 104, the computer server 102 may receive the stored data associated with the impression(s) from the cookie set on the computing device 104 in response to the computing device 104 accessing the domain associated with the computer server 102. As such, the computer server 102 may receive information on the advertisements and/or emails viewed, when the advertisements and/or emails were viewed (e.g., a time stamp), and in what order the advertisements and/or emails were viewed. This information be used to customize (e.g., tailor) future advertisements and/or emails to a particular user. The information may also help to customize and/or personalize the content the user sees on the operator's sites (whether web, mobile, etc.).

In various implementations, the received data associated with the impression(s) is stored in a database. For example, the database 110 may store the received data according to instructions from the computer server 102.

Flowcharts

Figure 2:
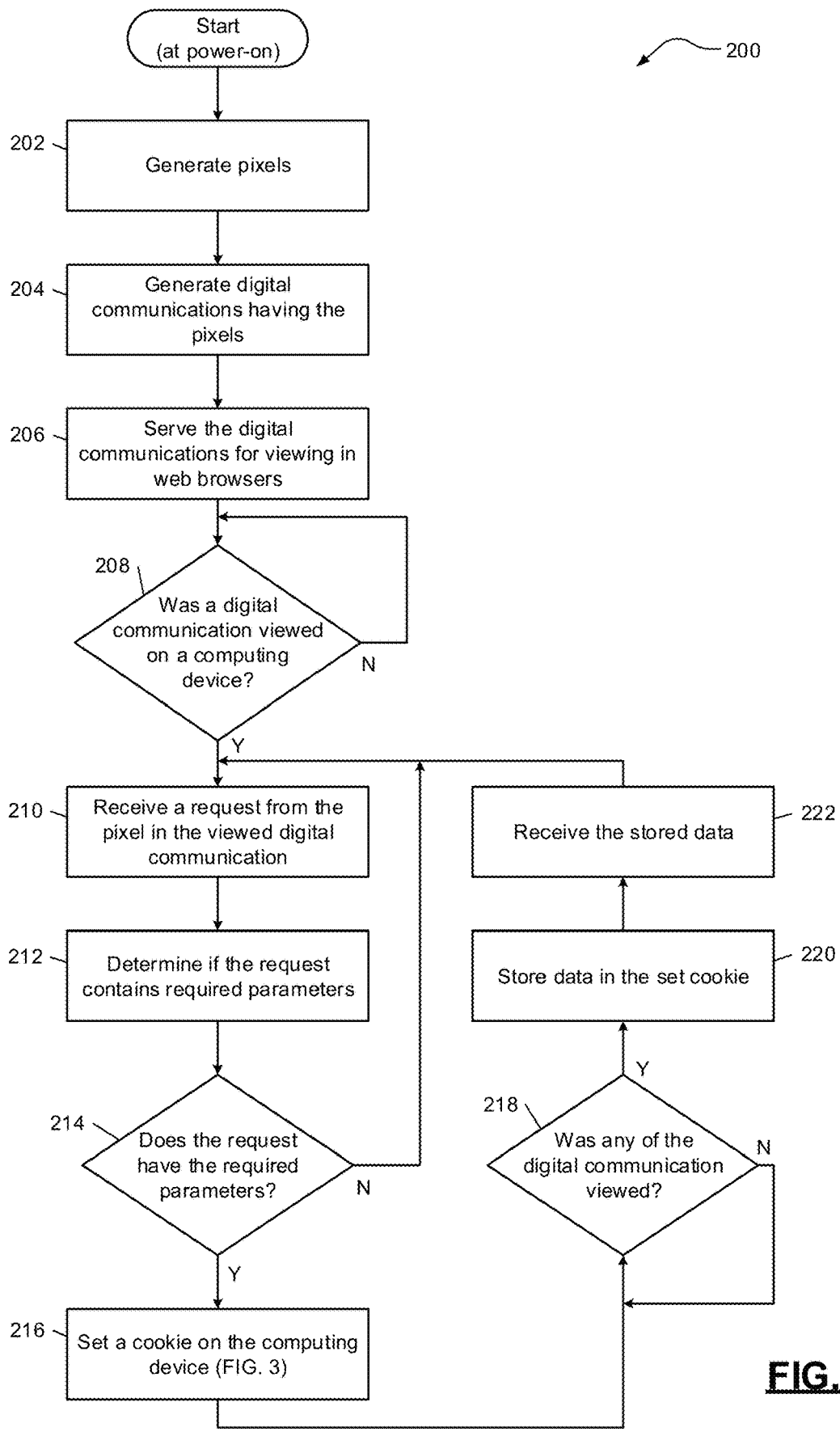
FIG. 2 is a flowchart of an example process for capturing impression data according to the principles of the present disclosure.

In FIG. 2, an example impression data capturing process 200 performed by a computer server such as the computer server 102 of FIG. 1 is depicted. As shown, the process 200 may start at power-on of the computer server, at power-on of a particular module in the computer server. In other examples, the process 200 may start at another suitable time after power-on.

The process 200 begins at 202 where the computer server generates pixels. The pixels may be images for embedding in advertisements, emails, and/or other digital communications viewable in web browsers as explained above. Additionally, the pixels may carrying one or more cookies as explained above. In various implementations, the pixels may be stored in a database.

Digital communications having the pixels embedded therein are created at 204, and at 206 served to user computing devices for viewing. For example, the digital communications including their embedded pixels may be served from a domain associated with the computer server. In such examples, if the user views one of the digital communications in a web browser and has previously been to a domain associated with the computer server, the web browser may treat the cookies carried by the pixels as friendly first-party cookies.

At 208, the computer server determines if one of the digital communications was viewed on a computing device such as one of the computing devices 104, 106 of FIG. 1. If not, the process 200 may return to the determining step at 208 as shown in FIG. 2, and/or to another step in the process 200 such as the generating pixels step at 202, the generating digital communications step at 204, the serving step at 206, etc.

If one of the digital communications was viewed, the computer server may receive a request from the pixel (e.g., an endpoint) in the viewed digital communication at 210. For example, once the digital communications is viewed (e.g., a website, an email, etc. including the digital communication is accessed), the pixel in the digital communication may transmit a request to the computer server to download the pixel.

At 212, the computer server determines whether the request from the pixel contains required parameters. For example, the request may include a list of parameters for identifying the source (e.g., the origin) of the traffic, the content of the digital communication, etc. If the computer server determines the request from the pixel does not contain the required parameters at 214, the process 200 returns to, for example, the request receiving step at 210. In other examples, the process 200 may return to another suitable step such as the serving step at 206, the determination step at 208, etc.

If the computer server determines the request from the pixel does contain the required parameters at 214, the computer server sets a cookie on the computing device at 216. For example, the computer server may set one of the cookies carried by the pixel on the computing device (e.g., by the web browser), as explained above.

At 218, the computer server determines whether any of the served digital communications have been potentially viewed (that is, whether the pixel was requested by a computing device of the user). If not, the process 200 may return to the determining step at 218 as shown in FIG. 2, and/or another suitable step in the process 200. If yes at 218, the set cookie on the computing device stores data associated with an impression relating to each of the viewed digital communications at 220. For example, the cookie may store impression data identifying each particular digital communication (e.g., an advertisement, an email, etc.) viewed, and when the particular digital communication was viewed (e.g., a time stamp).

At 222, the computer server receives the impression data stored in the set cookie. For example, the computer server may receive the stored impression data from the cookie in response to the computing device accessing a domain associated with the computer server. In various implementations, the stored data is received by the computing device and not the server, and separately the data is stored into the database by the server. After the impression data is received by the computer server, the process 200 may return to the request receiving step at 210 as shown in FIG. 2, and/or another suitable step in the process such as the pixel generation step at 202, the digital communications generation step at 204, the determination step at 218, etc.

Figure 3:
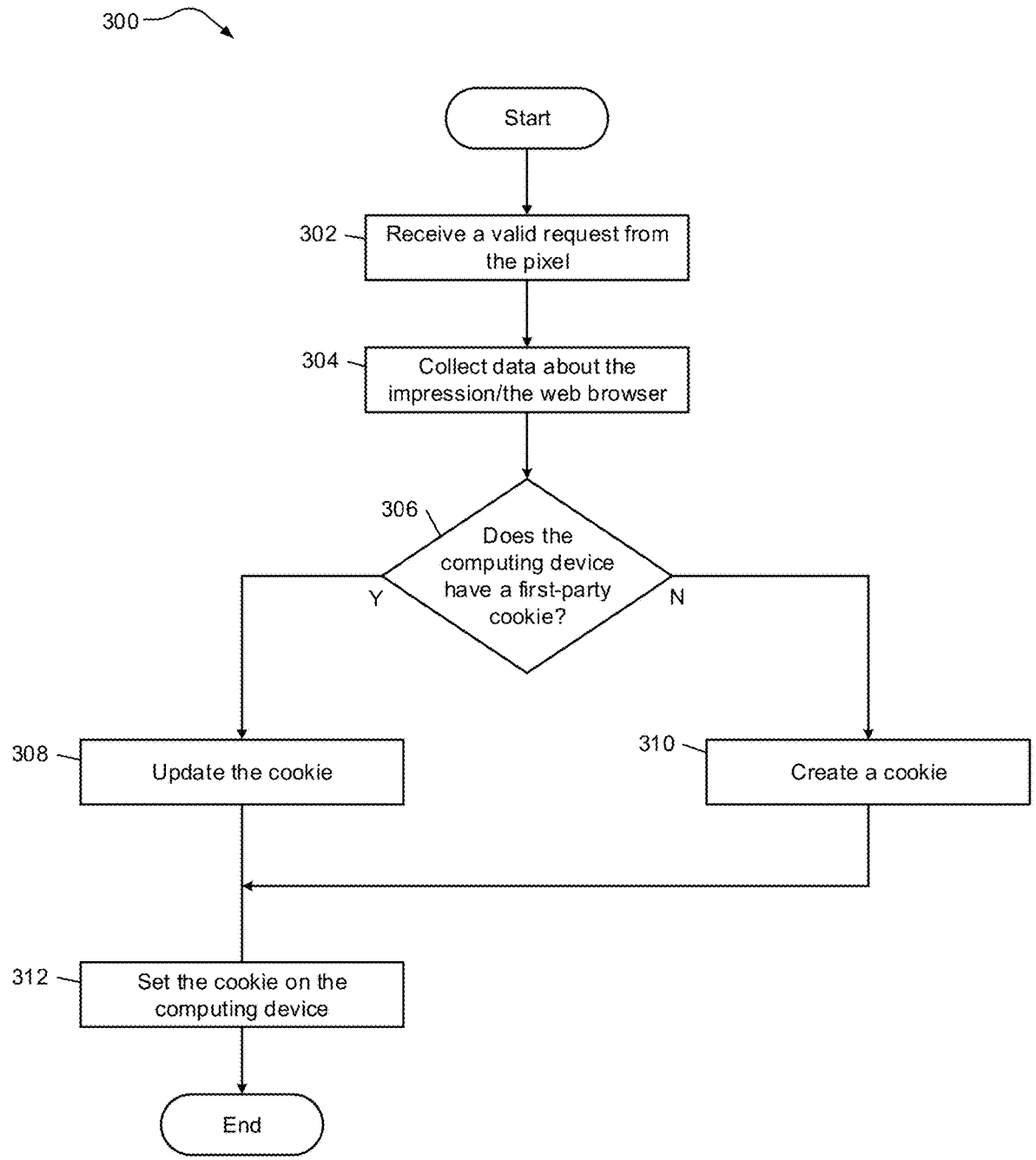
FIG. 3 is a flowchart of an example cookie setting process according to the principles of the present disclosure.

The cookie setting step at 216 may be implemented in any suitable manner. For example, in FIG. 3, a cookie setting process 300 performed by a computer server is depicted. The cookie setting process 300 may begin, for example, once the computer server determines the request from the pixel contains the required parameters as explained above.

For example, at 302, the computer server receives the valid request from the pixel. Next, the computer server receives (e.g., collects) data about the impression and the web browser used by a computing device to view the digital communication having the embedded pixel at 304. The received data may include information stored in a cookie previously set on a computing device, information about a computing device such as a particular web browser used to access the digital communication (e.g., accessing a website, an email, etc. including the digital communication), etc.

At 306, the computer server determines whether an existing first-party cookie has been set on the computing device from the computer server. If a first-party cookie has been set on the computing device, the computer server may optionally update the cookie at 308. For example, the computer server may update the cookie with new values relating to the defined number of impressions storable in the cookie, the expiration date of the cookie, the domain (e.g., the host to which the cookie will be sent), etc. If a first-party cookie has not been set on the computing device, the computer server may create a cookie at 310. For example, the computer server may generate a cookie based on the received data (at 304) such as the information about the particular web browser employed by the computing device. This may ensure the web browser treats the cookie as a first-party cookie. Once the existing first-party cookie is updated at 308 or a new first-party cookie is generated at 310, the computer server may set the cookie on the computing device at 312.

As explained herein, a set cookie may be limited as to the number of impressions it may store. For example, in FIG. 4, a process 400 for limiting the number of impressions storable in a set cookie is depicted. Some or all portions of the process 400 may be implemented with a computer server such as the computer server 102 of FIG. 1. The process 400 may start at power-on of the computer server, at power-on of a particular module in the computer server. In other examples, the evaluation process 400 may start at another suitable time after power-on.

At 402, the computer server defines a number of impressions storable in a cookie. The defined number of impressions may include any suitable number, and may be set by, for example, the process of FIG. 6 or by user input. At 404, the computer server sets the cookie capable of storing the defined number of impressions on a computing device, or updates an existing cookie on a computing device so it is capable of storing the defined number of impression. At 406, data associated with an impression is stored in the set cookie, as explained herein.

Next, a determination is made regarding the total number of impressions stored in the cookie at 408. For example, a determination is made as to whether the total number of impressions stored in the cookie is less than the defined (e.g., set) number of impressions. If yes (e.g., the impressions stored in the cookie is less than the defined number of impressions), the process 400 returns to the storing data step at 406. If no (e.g., the impressions stored in the cookie is equal to the defined number of impressions), one of the stored impression is pushed out of the cookie at 410 and the newest impression is stored in cookie at 412. In various implementations, the oldest impression is the one pushed out.

For example, the computer server may set the defined number of impressions to equal ten impressions. Additionally, the cookie may store impressions in a chronological order as explained above. In such examples, if ten impressions are stored in the cookie, and a new impression is ready to be stored, the oldest stored impression may be pushed out of the cookie at 410 and the newest impression may be stored in cookie at 412.

Figure 4:
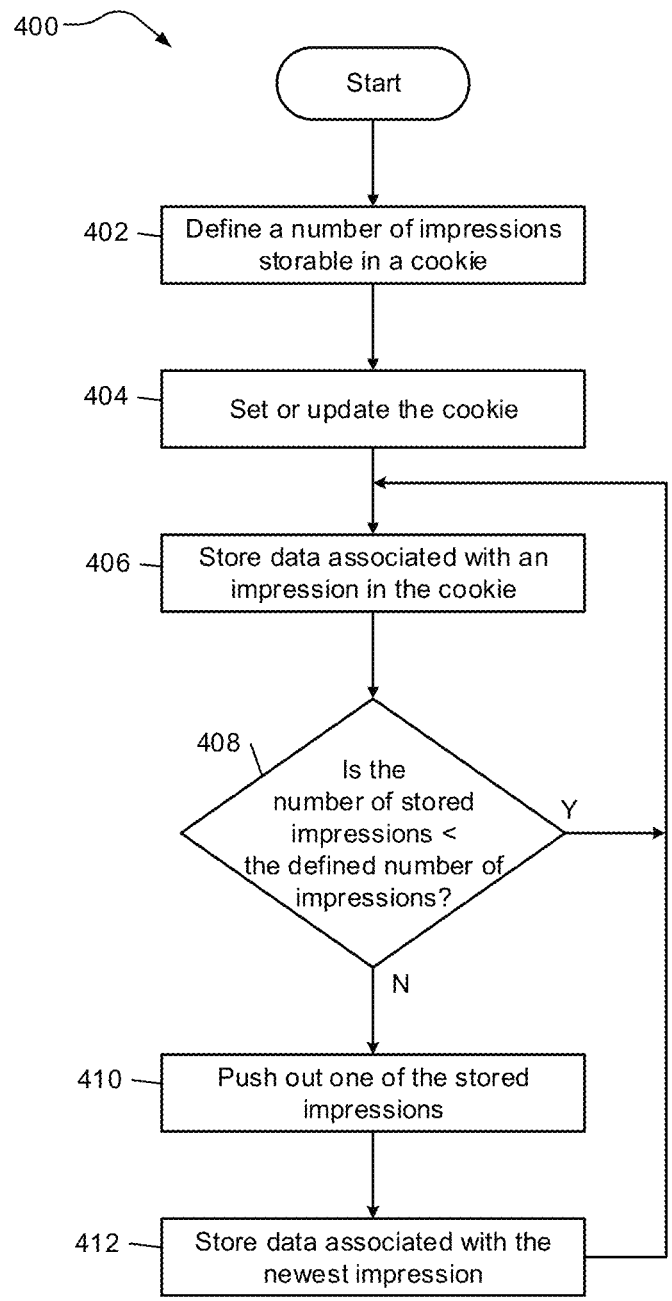
FIG. 4 is a flowchart of an example process for limiting a number of impressions storable in a cookie according to the principles of the present disclosure.

Once the newest impression is stored in cookie at 412, the process may return to the storing data step at 406 as shown in FIG. 4. In some embodiments, some or all of the impressions may be pushed out if, for example, the computer server receives the data associated with the impressions as explained above.

Figure 5:
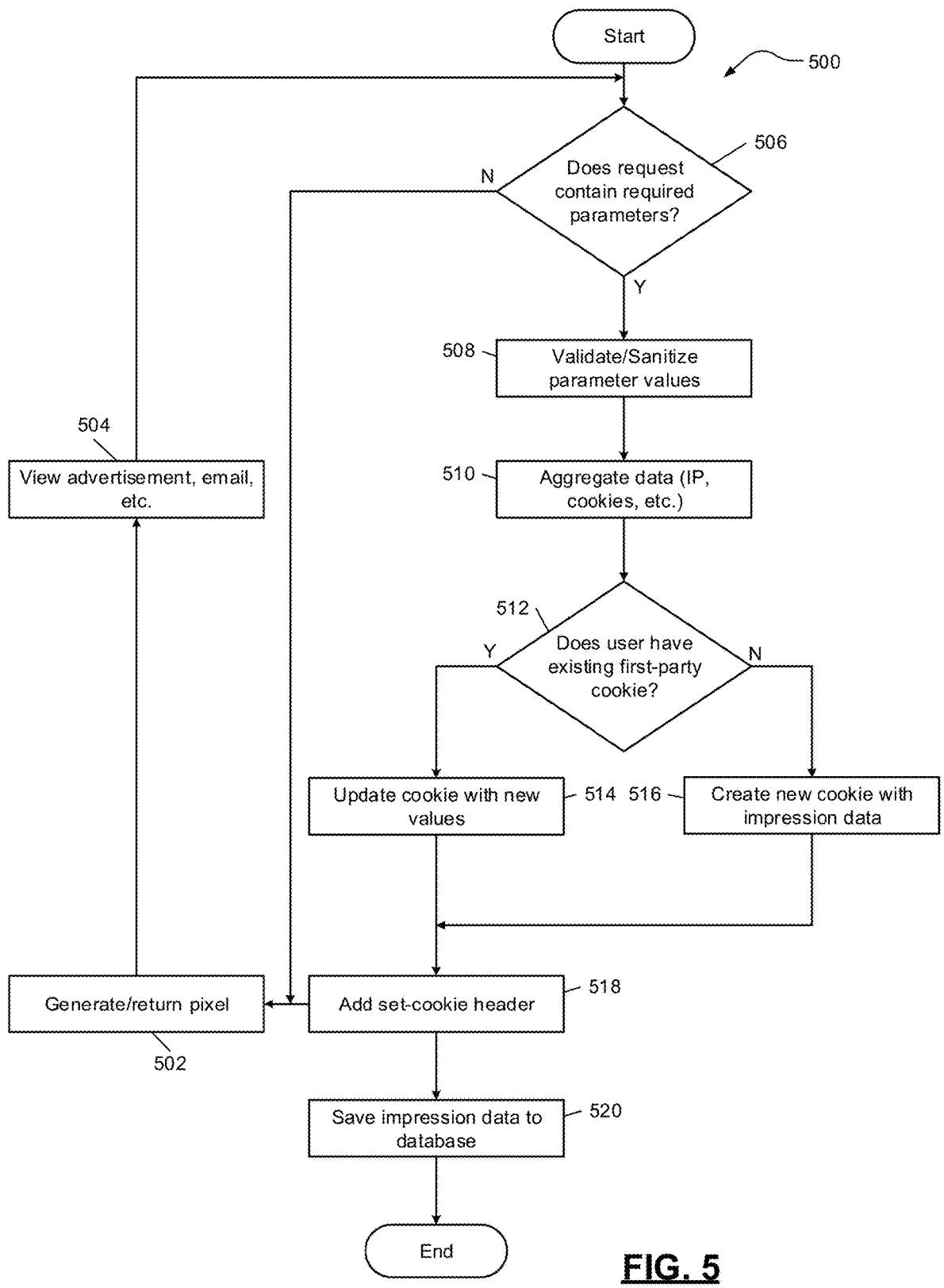
FIG. 5 is a flowchart of another example process for capturing impression data according to the principles of the present disclosure.

In FIG. 5, an example impression data capturing process 500 performed at least in part by a computer server such as the computer server 102 of FIG. 1 is depicted. As shown, the process 500 may begin at 502 where a pixel is generated for embedding in a digital communication (e.g., an advertisement, an email, etc.). The digital communication may be served from the computer server, and the pixel may carry one or more cookies (e.g., some or all first-party cookies), as explained herein.

Once the digital communication is viewed (e.g., accessed) by a computing device via a web browser at 504, the computer server receives a request from the embedded pixel. Next, the computer server determines if the request contains required parameters (as explained above) at 506. If the request does not contain the required parameters, the computer server returns the pixel at 502 and continues to serve the digital communication as explained above. If the request does contain the required parameters, the computer server may validate and/or sanitize the parameter values at 508. For example, the computer server may validate and/or sanitize the parameter values to ensure the values have not been manipulated, injected with malicious code, etc.

At 510, the computer server may aggregate data about the digital communication (e.g., an advertisement, an email, etc.) and the web browser used by the computing device. For example, the computer server may collect (e.g., receive) data associated with an impression such as what particular advertisement was viewed, when the advertisement was viewed, etc., and data identifying the web browser used by the computing device. The data may include data stored in a set cookie as explained above, data relating to an IP address of the computing device, etc.

At 512, the computer server determines whether an existing first-party cookie is set on the computing device. The computer server may make this determination based on, for example, the data aggregated at 510. For instance, the computer server may determine if the computing device has accessed a domain associated with the computer server (e.g., via a particular web browser) based on data relating to the IP address, the web browser, cookies, etc.

If the computer server determines that an existing first-party cookie is set on the computing device, the computer server may update the cookie with new values (as explained above) at 514. If the computer server determines that an existing first-party cookie is not set on the computing device, the computer server may create (e.g., generate) a new cookie (as explained above) at 516. For example, the computer server may generate a first-party cookie based on the received data (at 510) such as the impression data, information about the particular web browser employed by the computing device, etc.

Once the existing first-party cookie is updated at 514 or a new first-party cookie is generated at 516, the computer server may add a set-cookie header at 518. This header may provide instructions to set the updated or new first-party cookie when appropriate. After the set-cookie header is added at 518, the computer sever may return the pixel with the updated or new first-party cookie at 502 and save impression data to a database at 520, as explained above.

Figure 6:
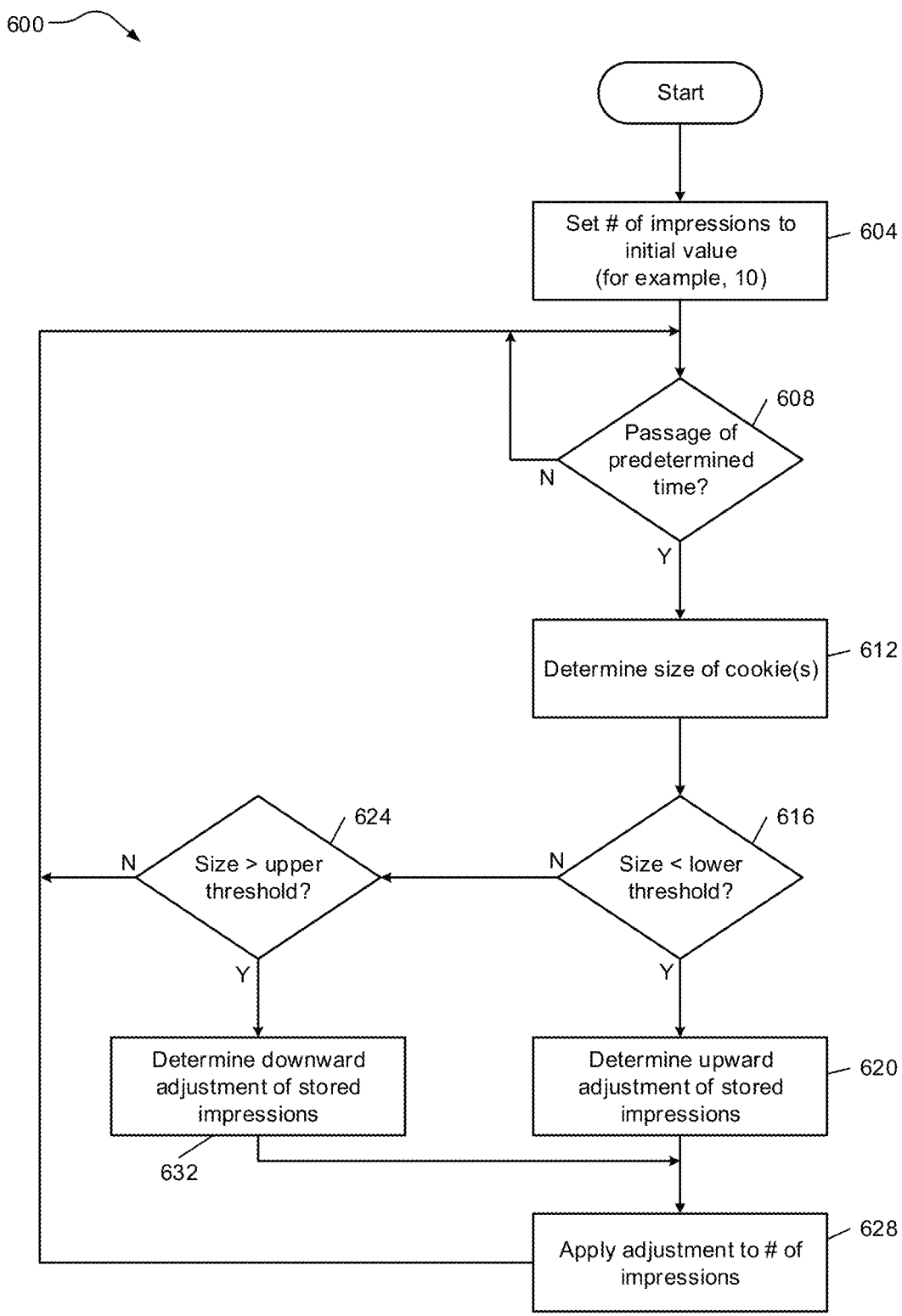
FIG. 6 is a flowchart of example adaptive control of storage parameters according to the principles of the present disclosure.

In FIG. 6, an example process 600 for setting the number of impressions to be stored into the first-person cookie is described. The process 600 may begin for all users when the first-party cookie system is first commissioned. In various other implementations, the process 600 may be separately conducted for each user, and may therefore start when a new user is identified.

According to current browser implementations, the total size of cookies for a domain is capped at certain limits, which may vary by browser. As one numeric example, all modern, widely-available browsers support a total cookie size of approximately 4096 bytes (4 KB). To prevent the first-party cookie from using up the entire cookie space for the operator's domain and preventing other cookies from being set, the amount of space occupied by the first-party cookie is constrained. This may be achieved by limiting the maximum number of impressions stored into the first-party cookie. As an example, the size of impression data may be limited to 500 bytes, which may correspond to approximately 10 impressions.

The present disclosure describes analyzing the size of the cookie space and adjusting the maximum number of impressions stored over time. In various implementations, an artificial intelligence (AI) or machine learning (ML) system is used to learn and adjust the number of limitations, which may be performed on a per-user basis. The following description is a simplistic illustration of closed-loop control of the maximum number of impressions.

At 604, control sets the number of impressions (that is, the maximum number of impressions allowed to be stored into a first-party cookie) to an initial value, such as 10. At 608, control determines whether a sufficient amount of time has passed since the prior analysis. For example only, a predetermined time may be configured, such as 7 days, 30 days, etc.

If the predetermined period of time has passed since control last transitioned to 612, control transitions to 612. Otherwise, control remains at 608. At 612, control determines a size of the user's cookie, such as in bytes. In various implementations, the size determined is based on the cookies of multiple or even all users. For example, a mean or median of the sizes may be determined. In various implementations, the size may be calculated as the mean plus one standard deviation.

At 616, control determines whether the size is less than a lower threshold. If so, control transfers to 620; otherwise, control transfers to 624. The lower threshold may be a defined number such as 512 (bytes). At 620, control determines an upward adjustment for the number of stored impressions. For example, control may subtract the size from the lower threshold to obtain a delta and then divide the delta by an average size of an impression. The average size of an impression may be determined empirically or may be configured by a developer.

Control then continues at 628, where control applies the determined adjustment to the number of impressions. Control then returns to 608 to wait once again for passage of the predetermined time.

At 624, control determines whether the size is greater than an upper threshold. As an example only, the upper threshold may be 544 (bytes). If the size is greater than the upper threshold, control transfers to 632. Otherwise, control returns to 608 to wait once again for passage of the predetermined time.

At 632, control determines a downward adjustment of the number of stored impressions. For example, control may subtract the upper threshold from the size to obtain a delta and then divide the delta by an average size of an impression. The average size of an impression may be determined empirically or may be configured by a developer. Control then continues at 628.

FIGS. 2-6 show the implementation of the processes 200, 300, 400, 500, and 600 as following particularly ordered steps. In other implementations, the steps of the processes 200, 300, 400, 500, and 600 may implemented in a different order and/or in parallel, some of the steps may be omitted, etc.

In some examples, the computer servers disclosed herein may include one or more modules for implementing features disclosed herein. For example, the computer server 102 of FIG. 1 may include content management module for generating pixels having first-party cookies, serving digital content with pixels embedded therein, etc. Additionally and/or alternatively, the computer server 102 may include a cookie management module for setting cookies (e.g., transmitting instructions to set one or more cookies), receiving impression data from the cookies, etc.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for capturing impression data, the system comprising:
    a computer server in communication with a user's computing device via a communications network and configured to:
        generate a pixel for embedding in a digital communication viewable in a web browser on the user's computing device, wherein the pixel is served from a domain associated with the computer server;
        in response to the digital communication being viewed in the web browser on the user's computing device, set a cookie on the user's computing device via the pixel, wherein:

the cookie is configured to store data associated with a defined number of impressions of digital communications viewed on the user's computing device, the cookie is configured to store data associated with the impressions in a chronological order, and in response to the defined number of the impressions being reached, the cookie is configured to exclude data associated with the oldest viewed impression and store data associated with the newest viewed impression; and in response to the user's computing device accessing the domain via the web browser, receive the stored data associated with the impressions from the cookie set on the user's computing device.

2. The system of claim 1, wherein the computer server is configured to update the cookie set on the user's computing device.

3. The system of claim 1, further comprising a database in communication with the computer server and configured to store the received data associated with the impressions.

4. The system of claim 1, wherein the data associated with each impression includes data identifying an advertisement and data identifying when the advertisement was viewed.

5. The system of claim 1, wherein the defined number of impressions includes ten impressions.

6. The system of claim 1, wherein the cookie is treated by the web browser as a first-party cookie if the user's computing device has previously accessed the domain.

7. A computerized method of capturing impression data, the method comprising:

generating a pixel for embedding in a digital communication viewable in a web browser on a user's computing device, wherein the pixel is served from a domain associated with a computer server;

in response to the digital communication being viewed in the web browser on the user's computing device, using the computer server to set a cookie on the user's computing device via the pixel, wherein:

the cookie is configured to store data associated with a defined number of impressions of digital communications viewed on the user's computing device, the cookie is configured to store data associated with the impressions in a chronological order, and in response to the defined number of impressions being met, the cookie is configured to push out data associated with the oldest viewed impression and store data associated with the newest viewed impression; and in response to the user's computing device accessing the domain via the web browser, using the computer server to receive the stored data associated with the impressions from the cookie set on the user's computing device.

8. The computerized method of claim 7, further comprising updating the cookie set on the user's computing device.

9. The computerized method of claim 7, further comprising storing the received data associated with the impressions.

10. The computerized method of claim 7, wherein the data associated with each impression includes data identifying an advertisement and data identifying when the advertisement was viewed.

11. The computerized method of claim 7, wherein the defined number of impressions includes ten impressions.

12. The computerized method of claim 7, wherein the cookie is treated by the web browser as a first-party cookie if the user's computing device has previously accessed the domain.

13. A system for transferring data to and from a computing device of a user, the system comprising:

processor hardware; and memory hardware configured to store instructions for execution by the processor hardware, wherein the instructions include:

generating a pixel for embedding in a digital communication viewable in a web browser on a computing device, wherein the pixel is served from a domain associated with the system;

in response to the digital communication being viewed in the web browser on the computing device, setting a cookie on the computing device via the pixel, wherein:

the cookie is configured to store data associated with a defined number of impressions of digital communications viewed on the computing device, the cookie is configured to store data associated with the impressions in a chronological order, and in response to the defined number of impressions being met, the cookie is configured to push out data associated with the oldest viewed impression and store data associated with the newest viewed impression; and in response to the computing device accessing the domain via the web browser, receiving the stored data associated with the impressions from the cookie set on the computing device.

\* \* \* \* \*